Jan. 27, 1942.　　　　J. O. EDSON　　　　2,271,291
WAVE TRANSLATING SYSTEM
Filed April 1, 1936　　　5 Sheets-Sheet 1

INVENTOR
J. O. EDSON
BY
ATTORNEY

Jan. 27, 1942.   J. O. EDSON   2,271,291
WAVE TRANSLATING SYSTEM
Filed April 1, 1936   5 Sheets-Sheet 2

INVENTOR
J. O. EDSON
BY
*J. A. Burgess*
ATTORNEY

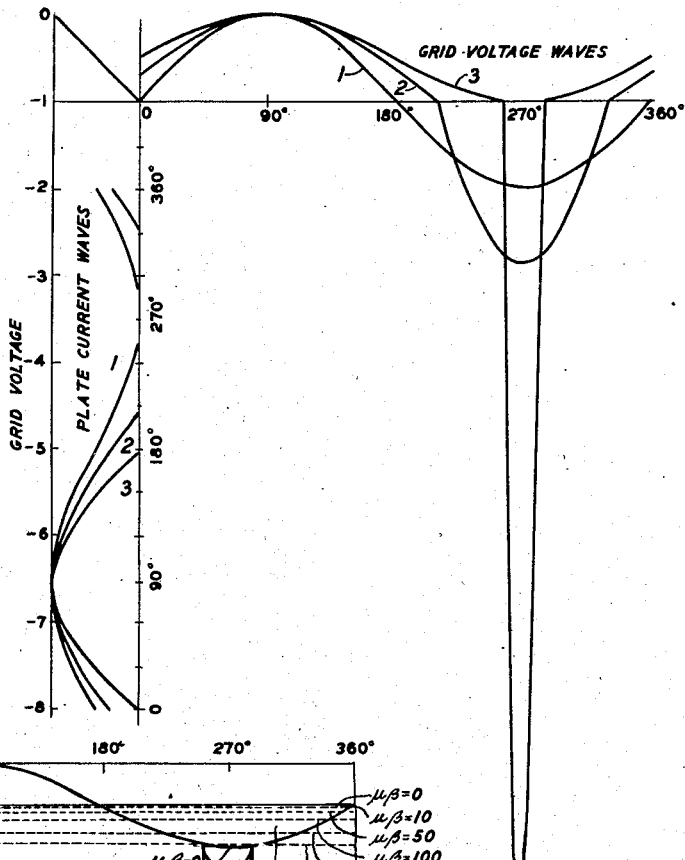
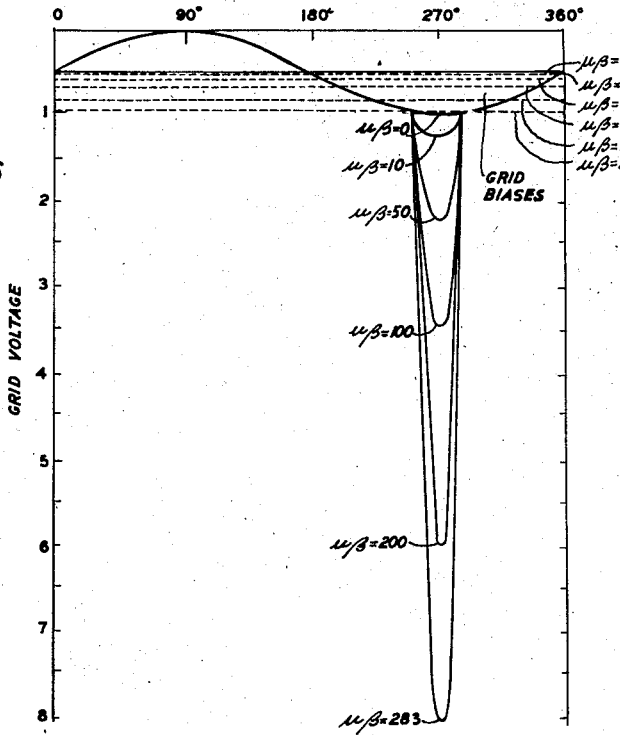
FIG. 5
FIG. 6
INVENTOR
J. O. EDSON
BY
ATTORNEY

Jan. 27, 1942. J. O. EDSON 2,271,291
WAVE TRANSLATING SYSTEM
Filed April 1, 1936 5 Sheets-Sheet 5
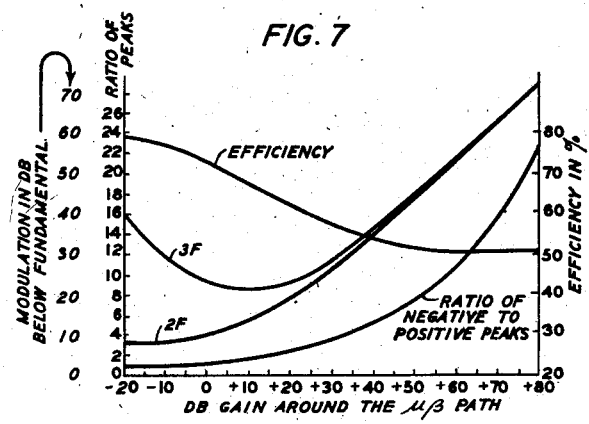
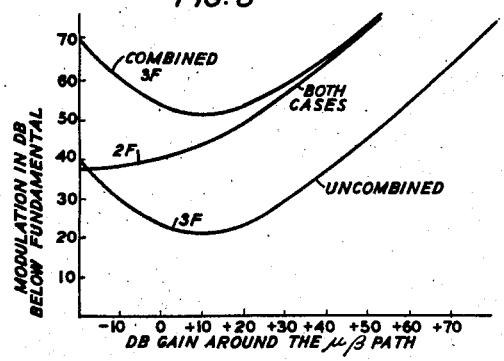
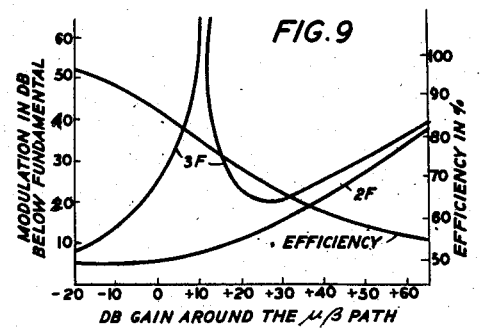
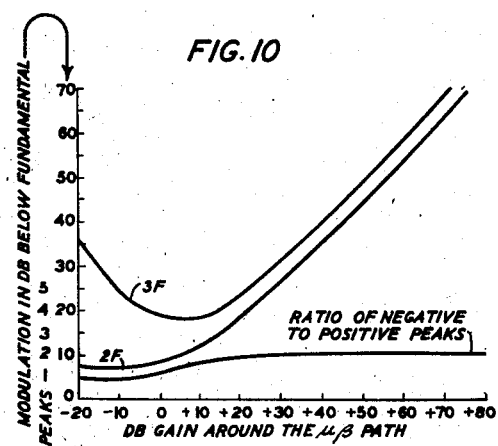
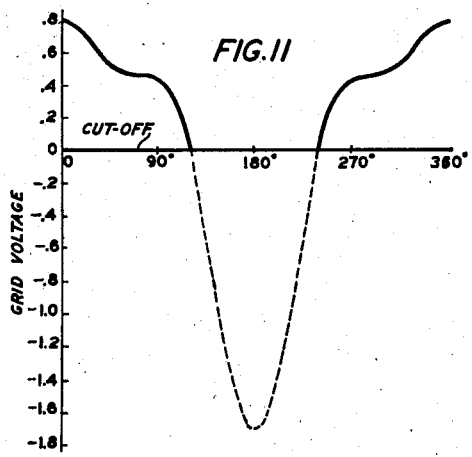
INVENTOR
J.O. EDSON
BY
ATTORNEY Patented Jan. 27, 1942

2,271,291

UNITED STATES PATENT OFFICE 2,271,291

WAVE TRANSLATING SYSTEM

James O. Edson, Great Kills, N. Y., assignor to Bell Telephone Laboratories, Incorporated, New York, N. Y., a corporation of New York Application April 1, 1936, Serial No. 72,026

14 Claims. (Cl. 179—171)

This invention relates to wave translating systems, as for example systems involving electric space discharge tubes or amplifying devices, and relates especially to retroaction or feedback in such systems.

An object of the invention is to control transmission properties of such systems, especially systems of the general type that feed back a portion of the output waves in gain-reducing phase and in amount sufficient to reduce distortion below the distortion level without feedback, a type disclosed for example in H. S. Black's paper on "Stabilized feed-back amplifiers," Electrical Engineering, January, 1934.

Representative objects of the invention are to control modulation or distortion, transmission efficiency, and plate-power efficiency in such systems, especially in such systems involving rectifiers or involving space discharge devices operated with space current interruptions, as for example, vacuum tube rectifiers, or so-called class B amplifiers, in which the grid bias is such that without feedback the space current is interrupted for the order of half the period of the waves to be amplified, or so-called class C amplifiers, which are biased below the plate current cut-off point.

It is also an object of the invention to facilitate application of feedback in such systems.

In one specific aspect the invention is embodied in a reverse feedback class B or class C amplifier, or a reverse feedback amplifier operated with plate current interruptions, in which, in accordance with the invention, direct current as well as alternating current is fed around the feedback loop. This renders the amplifier a linear rectifier, useful for example as a modulator or demodulator.

A further feature is a rectifier across the grid-cathode circuit of the last stage of a reverse feedback class B amplifier, to reduce negative peaks of grid swing. This avoids overloading the preceding stage.

A further feature is restriction of the reverse feedback around a class B amplifier to the frequencies whose feedback is required for producing the requisite output purity. This serves to increase the reduction of distortion components fed back and reduce negative peaks of grid swing.

A further feature relates to a class B amplifier with an auxiliary grid, as for example a grid coplanar with the control grid, or a screen grid of a pentode, biased to extend the upper portion of the dynamic characteristic to its theoretical maximum value without necessitating driving the control grid positive. This reduces distortion and increases the load capacity of the amplifier. In accordance with a further feature of the invention, negative feedback may be provided for the amplifier, for example, to reduce distortion below that without feedback.

A further feature is adjusting the grid bias of a negative feedback amplifier to the value required to obtain a given ratio of signal to modulation, for a particular value of maximum output, without exceeding a given amount of feedback and consequent gain reduction.

A still further feature of the invention is a class B or C reverse feedback amplifier with the propagation through the feedback path adjusted to give a prescribed output wave for a given applied wave.

Other objects and aspects of the invention will be apparent from the following description and claims.

Figs. 4 to 11 show curves, for facilitating explanation of the invention.

Figure 1:
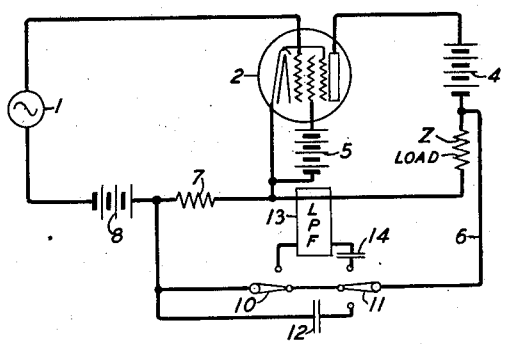
Figs. 1, 2 and 3 show circuits embodying forms of the invention.

In Fig. 1 an electric space discharge device shown as a pentode type of vacuum tube 2 translates waves received from a source of electromotive force 1 and delivers the translated waves to a receiving circuit or load which is shown as a generalized impedance Z in serial relation to plate current supply source 4. A source of electromotive force 5 supplies positive biasing potential for the screen grid of the tube. Negative feedback is provided by a feedback connection 6 shown as applying the voltage appearing across the load to impedance 7, which is in serial relation to source 1 and grid biasing potential source 8 in the grid circuit of the tube. The impedance 7 may be, for example, a resistance of the order of a megohm. The source 8 may supply negative bias just sufficient to reduce the plate current of the tube substantially to zero, for example, (in the absence of grid voltage from source 1).

The voltage delivered by source 1 may be of any desired character, as for example a sine wave to be amplified by tube 2 or to be rectified by tube 2, a speech modulated carrier wave to be amplified by tube 2 or to be demodulated or detected by tube 2, or a speech wave to be amplified by tube 2. With switches 10 and 11 in their position shown, the circuit including the tube 2 can operate as a rectifier linearized by the feedback through connection 6; and with switch 10 in its position shown and switch 11 operated to insert stopping condenser 12 in series in the feedback connection, the circuit can operate as an amplifier linearized by the feedback. The functions of low-pass filter 13 and stopping condenser 14, which can be connected in circuit by operating switches 10 and 11 to their upper positions, will be referred to hereinafter. The reasons why the circuit operates as rectifier and as amplifier will be apparent from disclosure hereinafter of a new method of computation, by which modulation in feedback circuits may be predetermined even for cases involving space current interruptions, and examples of applications of principles underlying the method. For the present, it may be said by way of explanation that with feedback and undistorted outputs, one fundamental difference between class A and class B or C single-sided amplifiers is that in the latter two cases the direct current attribute of the circuit is lost. What is meant by this and the reason for it will be indicated by an example. Assume a class B single-sided amplifier having considerable gain and whose dynamic characteristic is moderately linear and that frequencies can be transmitted with roughly the same efficiency around the amplifier and feedback paths from direct current to moderately high frequencies. Without feedback the overall characteristic except for any output transformer will tend to be that of a moderately linear rectifier. With 75 decibel feedback, for example, this becomes practically a perfect linear rectifier. Insert a condenser, for example, in the feedback path, and the characteristic is changed from an almost perfect linear rectifier to an almost perfect linear amplifier, the second and third harmonics of the amplifier being each 69 decibels below the fundamental. The matter has been checked experimentally with the oscillograph and the results of such experimental verification showed plainly that without a condenser the circuit works as a rectifier and with a condenser as an amplifier.

Figure 2:
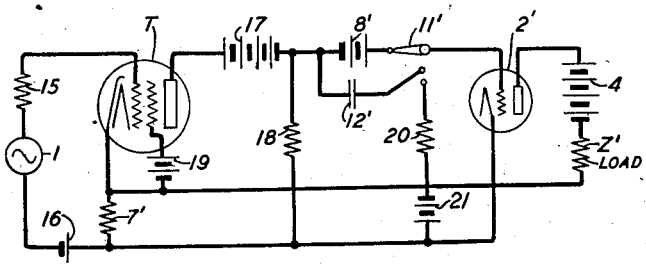

For example, Fig. 2 shows a two-stage negative feedback circuit similar to the single stage circuit of Fig. 1, and Figs. 2A, 2B, 2C and 2D, which will be discussed presently, show reproductions of oscillograms of output current of the circuit of Fig. 2 for a sinusoidal voltage input.

In Fig. 2, source 1 is shown feeding a vacuum tube T through a resistance 15, a source of grid biasing potential 16 biasing the grid of the tube for operation of the tube as a linear amplifier. A source of electromotive force 17 supplying space current for tube T is shown in series with plate resistor 18, whose magnitude may be of the order of 100,000 ohms, for example, and a resistor 7', whose magnitude may be of the order of 1,000 ohms, for example. A source of electromotive force 19 supplies biasing potential for the screen grid of the tube. This tube feeds a tube 2' shown as a triode by way of example. Space current for tube 2' is supplied by voltage source 4, shown in series with feedback resistor 7' and load Z'.

The principal feedback in the circuit is the negative feedback to the grid of tube T due to the flow of the plate current of tube 2' through resistor 7'. Local feedback, such for example as the negative feedback around tube T due to flow of plate current of tube T through resistor 7' may be considered negligible.

When switch 11' is on its upper contact battery 8' and the direct current voltage drop across resistor 18 supply biasing potential for the grid of tube 2'; and when the switch is on its lower contacts, a stopping condenser 12' is connected in circuit in place of battery 8' and a source of electromotive force 21 supplies biasing potential for the grid of tube 2' through a grid leak resistor 20. In either position of the switch the grid bias may be a negative bias just sufficient to reduce the plate current of the tube substantially to zero, for example, (in the absence of voltage from source 1 on the grid of tube T).

Figure 2A:
Figs. 2A, 2B, 2C, 2D, 3A and 3B show reproductions of oscillograms.

The oscillogram reproduced in Fig. 2A is for a condition in which switch 11' is on its upper contact, so that everything (i. e., both alternating current and direct current) is fed back, this producing a perfect half sine wave.

Figure 2B:

The oscillogram reproduced in Fig. 2B is for a condition in which switch 11' is on its lower contacts, so that only alternating current is fed back. The amount of feedback is comparable with that for the case of the oscillogram of Fig. 2A, approximately 35 decibels, (i. e. $\mu\beta$ in decibels is approximately 35, where $\mu$ and $\beta$ have the significance given in H. S. Black's paper mentioned above and the value of $\mu$ considered is the value when tube 2' is transmitting). The broken portion of the wave has been reduced from 180 degrees to approximately 70 degrees. A wave of this shape will have harmonics about 30 decibels below the fundamental. With increasing feedback this method gives operation approaching that of a perfect amplifier.

Figure 2C:
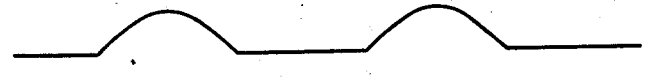
Figure 2D:

For example, the oscillogram shown in Fig. 2C is for a condition in which switch 11' is on its upper contact, so that everything (alternating current and direct current) is fed back, and the amount of feedback is approximately 60 decibels, this producing a perfect rectified wave; and the oscillogram shown in Fig. 2D is for a condition in which switch 11' is on its lower contacts, so that only alternating current is fed back, and the amount of feedback is the same as in the case of Fig. 2C, and this results in a clean sine wave output.

Thus the effect of feeding back the direct current with the alternating current is clearly shown in Figs. 2A to 2D.

From the foregoing discussion, it will be seen that a requirement to be observed in applying negative feedback to class B and C single-sided amplifiers, or to push-pull amplifiers biased beyond plate current cut-off, is that, for distortionless amplification, the direct current must be suppressed somewhere in the $\mu\beta$ path.

It is noted that, in Fig. 1, for all frequencies, or at least for all frequencies that are to be fed back, (direct current being regarded as current of zero frequency), the impedance of the load Z should be of sufficient magnitude to produce effective feedback. For example, with tube 2 serving as a rectifier demodulating speech-modulated carrier waves from source 1, the load Z may include a low-pass filter feeding a telephone receiver or loud-speaker, the filter attenuating the frequencies above the voice range and freely passing the speech waves to the receiver. Then if the load impedance is the input impedance of the filter, the initial impedance element of the filter may be a series inductance presenting substantial impedance to frequencies above the voice range. If, on the other hand, an amplifier tube is inserted between the rectifier and the filter or frequency selective circuit for selectively transmitting the voice frequencies, the input impedance of the amplifier stage may be of substantial magnitude for speech and carrier waves, any frequency selective circuit for selectively transmitting the voice waves to the receiver then being permissible.

In a negative feedback amplifier, it is sometimes advantageous to suppress feedback of alternating currents of certain frequencies. In Fig. 1 the filter 13, which may be connected in circuit by closing switches 10 and 11 on their upper contacts as referred to above, can serve this purpose. When the output of source 1 is a sine wave, for example, the filter may freely pass the fundamental and its second and third harmonics and attenuate alternating currents of higher frequencies. The condenser 14 suppresses feedback of direct current. As will be explained hereinafter, the suppression of feedback of the higher harmonics can increase the reduction that is produced in the second and third harmonics by negative feedback, and can reduce objectionable negative peaks of grid swing.

Figure 3:
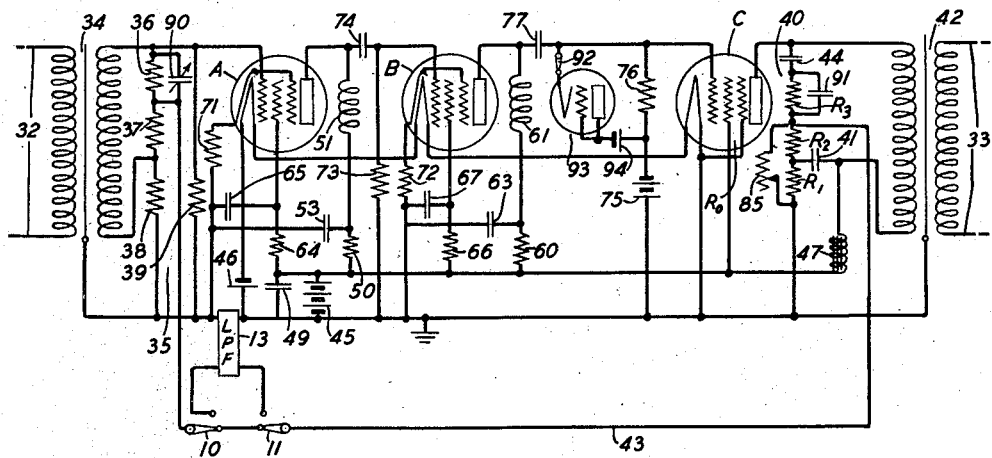

Regarding these peaks, in the operation of single-sided class B or C feedback amplifiers an important limitation may be presented by the property that large negative peaks of grid swing are required, which may make a very great load for the driving stage that supplies these peaks of voltage. An amplifier with means for avoiding or reducing the large negative peaks is shown in Fig. 3, about to be described. The reasons for the occurrence of the large negative peaks, and the principles underlying operation of the means for avoiding these peaks, will be apparent from the explanation, hereinafter, of the above-mentioned modulation computation method and applications thereof.

Fig. 3, shows a negative feedback amplifier comprising vacuum tubes A, B and C in cascade connection which amplifies waves received over incoming line or circuit 32 and transmits the amplified waves to outgoing line or circuit 33. The circuits 32 and 33 may be of any suitable type. They may be for transmitting a sinusoidal or single frequency wave; or they may be, for example, sections of a non-loaded multiplex carrier telephone cable circuit, the amplifier amplifying simultaneously the waves of a number of carrier telephone channels and/or carrier telegraph channels, extending over a frequency range from 8 kilocycles to 100 kilocycles for instance.

The incoming circuit 32 comprises an input transformer 34 and is connected to the input side of the amplifier through the transformer 34 and an input bridge 35. The four ratio arms of the bridge comprise the four resistances 36, 37, 38 and 39, respectively. The circuit 32 is connected across the arms 36 and 37 in series and forms one diagonal of the bridge. The input circuit of the amplifier is connected across the arm 39.

The output circuit of the amplifier is connected to the outgoing or load circuit 33 through an output bridge 40 and a stopping condenser 41, the stopping condenser having negligibly low reactance for the waves to be amplified.

An output transformer 42 is included in the outgoing circuit. The space discharge path resistance or impedance $R_0$ of the last stage of the amplifier is one ratio arm of the bridge and the circuit 33 is across the output diagonal of the bridge. The four ratio arms of the bridge are designated $R_0$, $R_1$, $R_2$ and $R_3$.

Across the resistances $R_1$ and $R_2$ in series is connected the input end of a feedback path for the amplifier, comprising conductor or feedback lead 43 and ground, the output end of this path being connected across the arms 37 and 38 of bridge 35. Thus, the feedback path is in a diagonal, (the feedback diagonal) of output bridge 40, and is also in a diagonal of the input bridge 35. Thus, the bridge 40 connects the outgoing circuit 33 and the feedback path in its opposite diagonals, and the bridge 35 connects the incoming circuit 32 and the feedback path in its opposite diagonals. Consequently, at balance of the input bridge, the feedback action and the operation of the amplifying system are independent of the impedance of the incoming circuit and moreover cannot affect the impedance which faces the incoming circuit at the amplifying system.

However, if desired, the input bridge may be unbalanced, with these impedances matched, for increasing the ratio of signal to resistance noise as disclosed in H. S. Black Patent 2,131,365, September 27, 1938. If desired the output bridge may be unbalanced, for working the tube C into a desirable value of impedance while matching the amplifier output impedance and the load impedance, as disclosed in that patent.

The amplifier is of the general type disclosed in the paper mentioned above, the feedback reducing the gain but at the same time reducing the transmission distortion and stabilizing the amplifier, as for example, against changes which tend to result from variations of tubes or tube energizing power that occur in the system. As in the case of the amplifiers of Fig. 1 and Fig. 2, by making $\mu$ much greater than unity, $\mu\beta$ can be made much greater than unity, or sufficiently large to yield a large amount of amplifier distortion reduction, and yet the gain of the amplifier can be large. For example, the value of $\mu\beta$ in Fig. 3 may be of the order of several times ten decibels.

The amplifier is shown as a three-stage amplifier, the first two stages comprising heater type pentodes A and B, and the third stage being shown by way of example as a pentode C with filamentary cathode.

These three tubes have a common plate battery 45 and a filament heating battery 46 sending heating current through the filaments of the three tubes in series.

Plate current for tube C passes from battery 45 through choke coil 47 and the primary winding of output transformer 42 to the plate of the tube and is prevented from reaching resistance $R_3$ by a stopping condenser 44. Condensers 49 and 41 cooperate with the choke coil 47 to prevent voltage fluctuations in the battery circuit from reaching the plate and to prevent the alternating current plate voltage from causing feedback in the amplifier through the common battery circuit. The stopping condenser 41 prevents voltage from battery 45 from reaching resistances $R_1$ and $R_2$ and is a by-pass condenser for waves of the frequency to be amplified. The stopping condensers 41 and 44 prevent feedback of direct current through conductor 43.

Plate current for tube A passes from battery 45 to the plate through a resistance 50 and an interstage coupling impedance or choke coil 51. The resistance 50 and a condenser 53 in conjunction with the condenser 49, form a frequency selective circuit for preventing voltage fluctuations in the battery circuit from reaching the plate and for preventing the waves in the alternating current circuit of the tube from passing to the portions of the plate battery circuit common to a plurality of tubes of the amplifier. The condenser 53 is a by-pass condenser for waves of the frequency to be amplified. The choke coil 51 may have a high resistance, for reducing phase shift in the amplifier (especially at frequencies below the utilized frequency range) which tends to result from the shunting of the transmission path by portions of the space current supply circuit.

Plate current for tube B passes from battery 45 through a resistance 60 and a choke coil 61 to the plate of the tube. Elements 60 to 63 function in connection with tube B in the manner in which elements 50 to 53 function in connection with tube A.

Battery 45 supplies steady positive biasing potential for the screen grid of tube A through a frequency selective network comprising a series resistance arm 64 and shunt capacity arms 65 and 49, and supplies steady positive biasing potential for the screen grid of tube B, through a frequency selective network comprising a series resistance arm 66 and shunt capacity arms 67 and 49. These networks prevent voltage variations from the plate battery circuit and voltage waves from the alternating current output circuits of tubes A and B from reaching the screen grids, and prevent waves in the screen grid circuits from passing to portions of the plate battery circuit common to a plurality of tubes of the amplifier. The resistances 64 and 66 adjust the voltages applied from battery 45 to the screen grids of tubes A and B, respectively, to the proper operating values.

Negative biasing potentials for the control grids of tubes A and B are obtained from the voltages across resistors 71 and 72, respectively, that result from flow of the space currents of the respective tubes through those resistors. The voltage across resistor 71 reaches the control grid of tube A, through resistor 39 and also through resistances 38, 37 and 36 in series, and also through resistance 38 and the secondary winding of input transformer 34 in series. The voltage across resistor 72 reaches the control grid of tube B through grid leak resistor 73.

Resistances 71 and 72 are not by-passed for alternating current and hence form a common impedance in the plate circuit and grid circuit of their respective tubes and produce negative feedback stabilizing the gain introduced by these two tubes A and B.

Negative biasing potential for the control grid of tube C is supplied from battery 75 through grid leak resistor 76. This bias may be such as to give class B operation of this tube, e. g. such as to reduce the plate current of the tube substantially to zero in the absence of alternating current voltage on the grid, so that the tube will operate about a point on its grid voltage-plate current characteristic just above the plate current cut-off point.

Condensers 74 and 77 are stopping condensers or coupling condensers.

Battery 45 is shown as supplying positive potential for the screen grid of tube C.

A variable resistance 85, connected across resistances R2 and R1 forms a shunt across the feedback path, adjustable for varying the gain of the amplifier. Decreasing the resistance 85 lowers the amount of feedback, which increases the amplifier gain.

Condensers 90 and 91 across resistors 36 and R3, respectively, assist in reducing tendency of the amplifier to sing around the feedback loop through conductor 43. The condenser 90 may be variable through a range of from 2 to 20 micromicrofarads, for example, and the condenser 91 may have a capacity of the order of 10 micromicrofarads, for example.

To reduce or avoid large negative peaks of grid swing on the control grid of tube C, a switch 92 can be operated to connect a rectifier 93 across the control grid and cathode of tube C so that the impedance across the grid circuit of this output tube is high for voltages on the characteristic and low for voltages beyond plate current extinction. The rectifier shown is intended to represent any suitable type of rectifier, as for example a copper-oxide rectifier or other form of rectifier. It is shown as a vacuum tube 93, which may be, for example, a 247-A Western Electric tube. A battery 94 with its negative terminal connected to the plate of the rectifier tube 93 is shown in circuit with that tube and the grid bias battery 75 for tube C, so that the negative biasing potential applied to the plate of the rectifier is somewhat greater than that applied to the grid of tube C; because the tube C is biased not quite to the plate current extinction point, and the rectifier or tube 93 should not act before the plate current of tube C is extinguished.

Tests with the oscillograph have shown that the wave form of the fed back wave as obtained in a class B amplifier with feedback actually does conform to the analytical predictions made in accordance with the above-mentioned modulation computation method. For example, Figs. 3A and 3B are reproductions of oscillograms showing the wave form of the voltage on the grid of the pentode in the last stage of a circuit of the type shown in Fig. 3 with the switch 92 open and with that switch closed, switches 10 and 11 remaining in the positions in which they are shown.

Figure 3B:
Figure 3A:

Fig. 3A shows the wave form of the grid voltage required on this grid to produce a given output with the switch 92 open so that the rectifier 93 is out of circuit. It is apparent that the wave is extremely unbalanced.

Fig. 3B shows the wave form on this same grid for the given output with the switch 92 closed for connecting the rectifier 93 across the grid circuit to present a low impedance to the negative peaks. The unbalance of the wave can be seen; but the ratio of negative to positive peaks is greatly reduced as compared to that in Fig. 3A.

As indicated above, and discussed hereinafter, the large negative peaks can be reduced by suppressing feedback of certain components. For instance, it was noted in connection with the class B amplifier of Fig. 1 that with a sine wave, for example, applied to the amplifier, the suppression of feedback of harmonics above the third not only increases the reduction of second and third harmonics obtained by the negative feedback but moreover reduces the negative peaks of grid swing. In Fig. 3, filter 13, which may be connected in circuit by switches 10 and 11, can likewise increase the reduction that feedback produces in the distortion components it passes and reduce negative peaks of grid swing on the grid of the output tube by suppressing feedback of frequencies above those of the distortion components that are to be reduced by feedback.

METHOD FOR EVALUATING MODULATION WITH FEEDBACK

*Introductory*

The following method is practical at very heavy loads on the tube, or when the amplifier is so operated that the grid voltage is driven beyond the plate current cut-off point, as in class B and class C amplifiers. With the grid biased to plate current extinction or nearly to plate current extinction, a number of tubes have been checked with as much as 50 decibels feedback and the feedback varied. The agreement between measurement and prediction has been very good, varying from several decibels to an exact check.

Not only is it practical to evaluate the modulation for class B and class C amplifiers, as well as for class A amplifiers by this method, but by the same method it is also possible to compute or predetermine other characteristics or properties of feedback systems, as for instance the operating point which is best for use for a particular tube when that tube is to be used in a feedback amplifier. Practical experience has amply demonstrated that the degree of approximation with which these method predict the optimum operating point and amount of modulation is reasonably precise.

The simplest method of estimating modulation has been to take the modulation without feedback, (expressed in decibels below fundamental), and add to that the number of decibels by which the feedback reduces the gain at the frequency of the modulation products, to get the modulation with feedback, (expressed in decibels below fundamental). This results in the correct solution provided the modulation is a function only of the fundamental load and is not affected by the harmonics applied to the input with feedback. However, as pointed out for example in the above-mentioned paper, the method is approximate because the input without feedback is free from distortion and with feedback it is not and, hence, the assumption that the modulation is a function only of the signal output is not necessarily justified. This assumption is not justified at very heavy loads on the tube and if here used, would lead to incorrect values. For pentode tubes or any tubes working with a bias far from the straight portion of the characteristic, even at light loads it may not be a useful assumption. For example, in the case of a 104D tube tested with more than normal bias, the third harmonic without feedback was quite good and the second very bad. With feedback both were improved but the third was not improved by nearly as much as the decibel gain reduction due to feedback. As another example, if the tube characteristic be assumed linear and biased at cut-off, without feedback the third harmonic would be absent; with feedback it would be present due to intermodulation between $f$ and $2f$. This is an example of where, when the third harmonic is very good without feedback, the additional of negative feedback makes it worse. In this case, however, after $\mu\beta$ is moderately large, the third harmonic will go down decibel for decibel with additional negative feedback.

The discussion of the method to be presented will be limited to the effect of modulation in the $\mu$-circuit with feedback.

Basis of the method

The underlying basis of the method is the application of Kirchoff's laws that is used in the above-mentioned paper, namely, that for a particular output wave, $\mu V$, the voltage across the points of entry (and therefore first grid) must be equal to the signal voltage applied at this place plus $\beta$ times $\mu V$, the voltage in the output, and in turn this grid wave must be such as to produce the particular output wave.

Description of the method

From this point on, the method differs in detail from the method of the above-mentioned paper, and the next step in the procedure is to make some simple and reasonable assumption as to the approximate value of either the input or output wave.

If a linear amplifier is sought, a reasonable assumption is that the output with feedback is linear. For example, if the incoming signal is sinusoidal, it would be assumed that the wave in the output with feedback is a pure sine wave. Then from the measured, assumed, or known characteristic of the overall amplifier, the input wave on the first grid or points of entry necessary for the assumed output can be determined, either graphically or analytically. The next step is to represent this necessary grid voltage wave by a Fourier series. To get the first approximation to the modulation in the output we simply add to the decibel value of the modulation present in the necessary grid voltage wave, the decibel reduction in gain due to feedback at the load under consideration. This gain reduction may be taken as the decibel reduction in gain due to feedback at no load at the particular modulation frequency of interest minus the further reduction in gain with load.

Under conditions of small feedback and great distortion, a repetition of the process may be necessary to give sufficiently accurate results. In such cases something other than a sine wave may be known to be a more reasonable assumption as to the first approximate value of the output wave.

Additional comments upon the description of the method

In the case of a feedback amplifier, the input wave is ordinarily very far from undistorted which was the reason for making an assumption relative to the output wave. On the other hand if the amount of feedback is 20 decibels or so and if the load is not excessive, the output wave does not deviate by any considerable amount from a pure copy of the applied wave. For most carrier applications, for example, the performance of the amplifier would not be satisfactory if the modulation in the output exceeded 40 decibels down on the fundamental. For such cases, for any practical graphical solution, it is a sufficiently good first approximation to assume that with a sinusoidal applied wave, the output wave is a pure sinusoidal wave.

It will also be assumed that the load impedance of the amplifier is a pure resistance. This is convenient because with a reactive load the dynamic characteristic is a loop.

Having an assumed value of output wave (direct current as well as alternating current), a pure resistance load, and the plate battery voltage, it is now possible to determine either from static characteristics or by actual measurement, the grid-voltage-plate-current characteristic of the tube or amplifier.

From this, the grid voltage which is required in order to deliver a sine wave output can readily be determined. This wave can be analyzed by a Fourier series for the direct current component and as many alternating current components as may be desired.

From the fundamental component of the input voltage and from the assumed fundamental output voltage it is possible to determine the effective amplification of the last tube under the particular load at which computation is made. From the light load $\mu$ and $R_0$ of the tube, the no load amplification of the last tube can be determined and the ratio of the two amplifications can be used to get the reduction in gain with load of the last stage at the particular load in question.

By measurement or computation the value of $\mu\beta$ at particular harmonic frequencies and at light load can be determined.

To get the first approximation to the modulation in the output, add to the number of decibels that the modulation in the grid circuit is below the fundamental, the number of decibels reduction in gain due to feedback at the load under consideration and at the frequency of the modulation. This should give a very fair approximation to the actual value of modulation which will be measured.

If the value of $\mu\beta$ is not large enough or if the load at which the amplifier is operated exceeds that for which the pure sinusoidal wave is possible it may be necessary to take a succession of approximations taking into account the phases and magnitudes of $\mu\beta$ at each frequency involved.

From the direct current term in the grid voltage wave determined by the series analysis, the bias at which the tube would have to be operated to produce the particular result in question can be determined and from that the no load current. It will usually be found that the full load plate current is larger than the no load plate current and if it is necessary to determine the modulation at a particular load and for a particular value of no load plate current, it will be necessary to make several computations for different values of full load plate current and interpolate to find the value for the desired no load current.

*Feedback of direct current and alternating current can produce linear rectifier*

If for simplicity, we assume that the feedback (i. e. $\mu\beta$) will be at exactly 180 degrees and will be the same for all alternating currents and that the tube in question is biased to the cut-off and has a dynamic characteristic that is perfectly linear to the cut-off; the effect of feedback can be computed fairly readily as follows: First, assume an output wave that is a portion of a sinusoidal wave broken for some convenient interval. Then, if feedback is applied and all frequencies including direct current are fed back alike, it is found that during the part of the cycle that the tube is active, the grid wave is the sum of a sinusoidal input wave and the fed back wave which is also a portion of a sinusoidal wave. During the portion of the time that the tube is cut off, nothing comes back and the grid wave is the input wave. The net result is that the shape of the output wave for a given load is the same as if no feedback were applied, but a great deal more input is required and the grid wave is distorted. In a practical case where the dynamic characteristic is not linear, the effect of feedback is to make the circuit more nearly a linear rectifier and, of course, less responsive.

*Feedback of alternating current alone tends to produce linear amplifier*

With the same conditions as above, let it be assumed that the direct current feedback is cut off as by a series condenser for example. Then by the addition of a (negative) component of battery bias equal to the (negative) direct current voltage component eliminated from the feedback voltage by the condenser, the same conditions could be realized for a particular load; or in other words, eliminating a direct current component of feedback voltage by the condenser has the effect of addition of a positive bias battery of voltage dependent upon the load. Thus, by assuming a wave in the output which is broken for a certain interval and making $\mu\beta$ large enough so that $\mu\beta$ times the direct current component of grid voltage corresponding to the direct current change in the output current that would result from the break equals the difference between the bias necessary to yield the particular output wave if no feedback were used and the bias actually to be used, the conditions with alternating current feedback only can be determined. It is, perhaps, possible to determine directly the output wave corresponding to a particular input and value of $\mu\beta$ but it is a great deal more convenient to assume an output and to work backward.

Using the above method of computation it is found that by the application of sufficient feedback an amplifier having a linear characteristic and biased to the plate current cut-off point can be made to yield as nearly a perfect reproduction of the input as may be desired. The method has important practical application. It has been used, for example, in working out the underlying relationships of the operation of class B and class C amplifiers. As shown by the above-mentioned paper, in the case of class A amplifiers it is possible to construct an amplifier having remarkable stability and linearity with improved phase characteristics and reduced noise, and an overall amplification independent of the exact amplifying properties of the vacuum tubes used. Feedback can be applied to class B and class C amplifiers to produce the same results. As in class A amplifiers, the improved results are achieved merely at the cost of some inexpensive gain. However, the amount of extra gain required to obtain a specified degree of perfection will be more than in class A amplifiers, because without feedback the output of either class B or class C amplifiers is inherently more distorted.

*Operation of class B and class C amplifiers with feedback*

The ability of negative feedback to improve the linearity and stability of a system operating with space current interruptions or with grid potential driven below the plate current extinction point is of great economic as well as technical importance. The attainment of high power and high quality together in an amplifier is especially valuable since the power stages of an amplifier are the most expensive to construct and operate. To make tubes in such stages larger so that a specific output would represent a smaller load in comparison to their full load capacity has been a costly expedient from both standpoints. However, gain can be added very inexpensively ahead of the power stages, i. e., at comparatively low transmission levels, and by applying negative feedback the power stage can be operated with greatly improved characteristics or a much smaller power stage can be operated with equivalent quality of output, even in the case of operation with grid potential driven below the plate current extinction point as in class B and class C amplifiers.

To give an over-all picture of operation under these conditions, it has been assumed in what follows that the dynamic characteristic above negative cut-off is linear. Under most conditions of practical interest, the results with feedback will be only slightly affected by the exact curvature of the tube characteristic and making this simplifying assumption will be helpful in readily discovering how the circuit operates. However, the analytical methods here used are equally applicable to a tube characteristic of any shape.

Three examples of operation with feedback of all alternating currents will now be given, illustrating wave shapes obtained.

Figure 4:
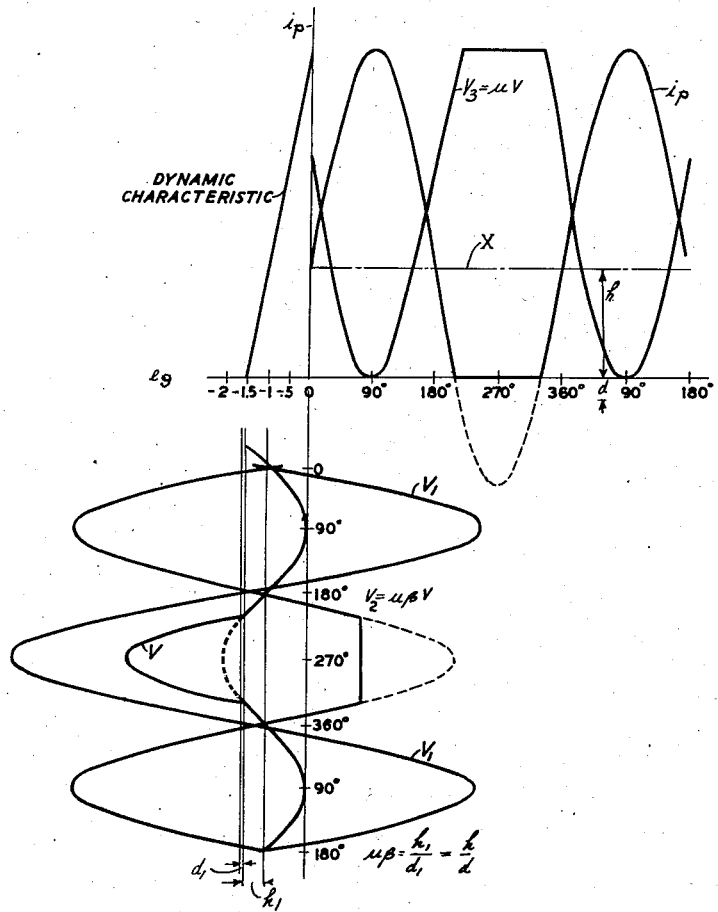

As the first example, assuming for simplicity that the phase shift around the feedback loop is exactly 180 degrees and its magnitude and phase are independent of frequency, and that the tube has a dynamic characteristic that is perfectly linear to cut-off, Fig. 4 shows graphically the type of waves which will result in the grid and plate circuits if negative feedback is used to make possible the use of greater bias for a given modulation or harmonic level in the output. (The assumption that the dynamic characteristic or relation between plate current $i_p$ and $e_g$ is linear as shown, is equivalent to an assumption that the plate resistance $R_0$ is large compared to the load impedance.)

The grid bias voltage is taken as just sufficient to reduce the plate current to zero with no input. With the scale used in the figure, this grid bias voltage is $-1.5$ volts. The input applied (i. e., the input to the initial grid, without feedback), is assumed a sine wave of input voltage $V_1$, as shown. The load impedance is assumed pure resistance.

For the sinusoidal input $V_1$, the figure shows the wave of fed back grid voltage $V_2 = \mu\beta V$ and the wave of resultant grid voltage $V = V_1 + V_2$ which correspond to an assumed output wave of plate current $i_p$ shown to the right of the dynamic characteristic, for feedback of all frequencies except direct current, which is not fed back. The corresponding wave of output voltage $V_3 = \mu V$ is also shown to the right of the dynamic characteristic.

Thus, the figure shows how the wave $V_2$ fed back from the plate circuit combines with the sinusoidal applied voltage $V_1$ to produce the required grid voltage wave. Having found a plate voltage wave which when fed back will combine with the applied wave to produce the grid voltage wave required to produce that particular plate voltage wave, it is certain that we have the particular plate voltage wave that will be delivered when the amplifier has settled down to the steady state. The analysis would be more difficult if the feedback ratio were not assumed constant and at 180 degrees, but it seems likely that even in those cases a somewhat similar result would be obtained.

The dotted curves indicate the sine wave forms that $i_p$, $V_2$ and $V$ would have if the tube did not work to cut-off.

In the figure, $d$ is the average value, or the value of the direct current component, of the chopped-off portion of the wave $i_p$; and $d_1$ is the average value, or the value of the direct component, of the chopped-off portion of the sine wave that, as just noted, gives the wave form that $V$ would have if the tube did not work to cut-off. In the figure, $h$ is the current value given by the distance between the zero axis of $i_p$ and the line $X$ located midway between the positive peaks and the negative peaks of the sine wave of current that would be obtained by continuing the $i_p$ wave below the zero axis as shown by dotted curve; and $h_1$ is the voltage value given by the distance between the bias line or $-1.5$ volt line and the line that gives the average value of the sine wave that would be obtained from curve $V$ by changing the portion of curve $V$ to the left of the $-1.5$ volt line to the dotted curve shown. The quantities $h$ and $h_1$ are opposite in sign to the quantities $d$ and $d_1$, respectively. The value of $h_1$ is .5. The peak of wave $V_2$ is 4.59 measured from the $-1$ volt line. The peak of $V_1$ is 5.59 measured from the $-1.5$ volt or bias line. The value of $d_1$ is .108. The value of $$\mu\beta = \frac{h}{d} = \frac{h_1}{d_1}$$

because $V_2 = \mu\beta V$. Thus, the value of $\mu\beta$ is $$\frac{.5}{.108} = -4.59$$

In other words, the value of $\mu\beta$ required to obtain the plate current wave shown is $-4.59$, with the tube biased to plate current extinction in the absence of input. With this plate current wave shown, the duration of the plate current extinction period is only 120 degrees, whereas without feedback the duration of the plate current extinction period would be of course 180 degrees, since the tube is biased to extinction. That is, having chosen to operate with zero space current in the absence of input and having chosen to operate so as to obtain a plate current wave with plate current extinction period of only 120 degrees, we require (at all frequencies except direct current, which is not fed back) an amount of feedback corresponding to $\mu\beta = -4.59$ in order to obtain this plate current wave.

As a second illustrative example of wave shapes obtained with feedback of all alternating currents, Fig. 5 shows the grid voltage waves and plate current waves computed for a tube that is perfectly linear to the cut-off as shown in the figure when successively larger feedback is used, the fixed negative bias in all cases being at the cut-off. The curves labelled 1 are grid voltage and plate current waves for the tube with sinusoidal excitation and no feedback; the curves labelled 2 are for the same tube with a feedback ratio of 4.59, i. e. with $\mu\beta = -4.59$. It will be noted that, as already pointed out in Fig. 4, the amount by which the plate current is broken has been reduced from 180 degrees to 120 degrees and the grid wave is considerably distorted, having the negative peak large compared to the positive peak. Fig. 4 showed how the wave fed back from the plate circuit combines with a sinusoidal applied voltage to produce the required grid voltage wave. For curves 2 of Fig. 5 the value of $\mu\beta$ is assumed to be constant and equal to $-4.59$ at all frequencies except direct current. It is because direct current is not fed back that it is possible to raise the plate current so readily.

The curves labelled 3 in Fig. 5 show grid and plate waves for the same tube with a feedback ratio of 530. The addition of waves by which this result is obtained is not shown, because the scales would be too unfavorable; however, the principle is the same as in the case shown in Fig. 4.

As a third illustrative example of wave shapes obtained with feedback of all alternating currents, Fig. 6 shows the resultant wave shape and fixed negative bias at the input corresponding to different amounts of feedback for a tube having a dynamic characteristic that is perfectly linear to cut-off, assuming it is required that the output modulation be 44 decibels below the fundamental. The curves of Fig. 6 show how by adding negative feedback, the harmonic level in the output need not be degraded as additional negative bias is added to reduce the space current with no input. They also indicate the presence of the large negative peak previously referred to.

Tracing through the illustrative example of Fig. 6 in greater detail, if in the assumed linear tube, the cut-off occurs at −0.975 and a fixed bias of −0.5 is used, the modulation without feedback and with a sinusoidal input whose peak value is .5 is 43.8 decibels for the second harmonic and 44.2 decibels for the third harmonic. If a feedback ratio of 10 is used and if the plate current wave is to be made the same as before, the sketch shows the waves which will satisfy Kirchoff's laws in both the plate and grid circuits. The direct current bias term is now .5168 and the no load plate current is reduced, but at full load the plate current wave is the same as before. If the bias be increased to −.584, the feedback ratio must be increased to 50 to produce the same wave form in the output, and the grid voltage wave is still more distorted. For a bias of −.668, the feedback ratio must be 100 and the negative peak grid voltage goes to −3.5. With a bias of −.836, the feedback ratio must be 200 and the negative peak is −6, and for a bias of −.975, the required feedback ratio is 283 and the negative peak is −8.07. In this case the plate current is zero for no load and varies directly with the input and the modulation is independent of load. In any of the other cases the modulation is not independent of load but is perfect up to some particular load and then slopes down to the value mentioned (approximately 44 decibels) at the full load. In the assumed case it is possible to obtain the modulation of 44 decibels and work the amplifier so that no plate current flows under no load at a cost of 49 decibels sacrificed by feedback. The invention contemplates operation of a practical class B amplifier such as that of Fig. 1, 2 or 3 with the amount of the negative feedback such as to substantially render plate current proportional to input and modulation independent of load as just described in connection with the amplifier having the assumed linear characteristic to cut-off.

Class B single-sided amplifier

Fig. 7 shows effects of feedback on class B operation of a single-sided amplifier. The figure shows the amount of negative feedback required to produce a specific harmonic level in the output of a single-sided class B amplifier. The results are for full load out of the amplifier, and it is assumed that at no load the space current is zero and also that the plate current has a linear relation to the grid voltage above this point of cut-off. It will be observed that for a tube thus biased exactly to cut-off and having a linear characteristic to the cut-off, the third harmonic with gradually increasing values of $\mu\beta$ is first degraded from a very good value to a value only slightly better than the second harmonic and then improves with the second as larger values of feedback are used. It is also seen that when all harmonics are fed back, the negative peak required on the grid (biased to extinction with no input) is very great compared to that required for the same tube operated as a normal class A amplifier. The positive peak required is twice as great as for the case of normal class A operation. Without feedback the ideal efficiency is 78½ per cent. With feedback this efficiency is reduced and rapidly approaches 50 per cent as shown in the figure. This figure also shows how the working efficiency depends upon the amount of negative feedback and degree of linearity, assuming the harmonics meet no impedance in the output.

These curves illustrate that increasing the amount of feedback produces the same effect upon the plate current wave, for the ideal dynamic characteristic assumed, as would be produced by reducing the bias from a class B amplifier to a class A amplifier. Also the improvement in harmonics will eventually go down decibel for decibel as in class A amplifiers.

As can be seen from the efficiency and modulation curves, increasing the amount of feedback effectively reduces the bias and changes the operating conditions from class B into class A.

An interesting sequel to this is the fact that with a sufficient amount of feedback the operating point of the tube is independent of the condition set without feedback (and its dynamic characteristic is independent of the dynamic characteristic without feedback). With a large amount of negative feedback the operating point automatically adjusts itself to the most suitable value possible for each input applied.

This figure is another example which illustrates the improvement in harmonics due to feedback and shows that with a sufficient amount of feedback the harmonics will go down decibel for decibel.

It is important to note that, when large feedback is applied to amplifiers in which the power tube is biased near the cut-off, the ratio of negative to positive peaks of voltage is large. This may cause a large load on the voltage amplifier tubes and may even load them to the extent of preventing the desired improvement from being realized. Under some conditions this difficulty can be overcome, by the use of a rectifier for example.

Referring to Fig. 5, with $\mu\beta=-.530$ the ratio of negative to positive peaks is about 9. The complete wave shown must be transmitted from tube B to the grid of tube C of Fig. 3 if switch 92 is open because the impedance to ground from grid of tube C is then independent of the voltage applied as long as the grid is not positive with respect to the cathode of tube C. This is true because condenser 77 does not pass direct current. However, it may be seen that the portion of the grid voltage that is negative with respect to the cut-off voltage produces no effect upon the plate current and so is only necessary to balance the portion of the wave that is positive with respect to cut-off. The current flow through condenser 77 is of exactly the same form as the voltage wave shown and it is really the current wave which must be balanced and contain no direct current terms.

If the resistance from grid to ground can be made much lower for voltages negative with respect to the cut-off voltage than for voltages positive with respect to cut-off, the required current wave can be made to flow without the high voltage peak that was formerly associated with it. This can be accomplished by closing the switch 92 of Fig. 3 so as to connect rectifier 93 in circuit. Battery 94 is used so that the rectifier does not operate until the cut-off voltage is reached. This device makes an improvement in performance whenever the interstage impedance can be made high enough so that the voltage amplifier tube is able to deliver the current peak but cannot readily deliver the voltage peak.

Class B push-pull amplifier

Push-pull amplifiers in which the outputs are allowed to combine before being fed back are referred to as having combined feedback. Amplifiers in which the plate current in each tube controls a separate feedback is referred to as uncombined.

Fig. 8 gives a comparison of harmonic levels from idealized push-pull amplifiers with combined and uncombined feedback. The tubes are assumed to be perfect linear cut-off devices biased at cut-off. The balance between the two sides is assumed to be 30 decibels.

In each case the second harmonic is improved by the balance of the push-pull circuit. The third harmonics in the output are caused by the even harmonics in the fed back wave and so are as bad as in the single sided amplifier if the feedback is uncombined. If the feedback is combined the even harmonics fed back are reduced by the balance so the third harmonic is not as great by about the amount of balance.

With the perfectly linear tubes biased to cut-off as assumed above the only source of harmonics in the combined feedback case is unbalance between the two sides. Even with practical tubes the unbalance is the source of even harmonics but curvature of the characteristic is largely responsible for the odd harmonics. Therefore, the odd harmonics are not absent without feedback.

However, even with practical tubes, the advantage of combined feedback over uncombined feedback is very large. This means that the feedback circuit must be so connected that the balance may take place before the fed back voltage is picked up. The fed back voltage is then similar in wave form to the output voltage of the amplifier. This same voltage is then returned equally but in opposite phase to the inputs of the two sides of the push-pull amplifier. If this is not done the even harmonics fed back are greater than necessary and the odd harmonics in the output are made worse than they should be. The even harmonics may also be worse than with combined feedback. With correct feedback the modulation of a push-pull amplifier, whether class A or class B, should be improved over the modulation without feedback by about one decibel for each decibel of gain reduction. For the class B amplifier this would usually be about 15-30 decibels better than could be done with the single-sided amplifier and the odd harmonics would be 15-30 decibels better than with a push-pull amplifier having uncombined feedback.

This type of push-pull amplifier has the additional advantage that its theoretical maximum efficiency is 78½ per cent instead of 50 per cent as in the class A or linear single-sided class B amplifier and, further, this result can be obtained with a transformer or shunt fed resistance load.

Class C amplifier

Fig. 9 shows effects of feedback on class C operation of a single-sided amplifier.

This figure should be compared with Fig. 7. Such a comparison will reveal the following:

1. Increasing the negative bias beyond the cut-off only requires more feedback to produce the same harmonic level or the same efficiency.

2. The efficiency with feedback approaches the same limit, 50 per cent, which corresponds to class A operation.

3. The efficiency of a class C amplifier without feedback approaches 100 per cent instead of the 78.5 per cent as the limit of a class B amplifier.

4. For a given efficiency, irrespective of the operating conditions (proper biases without feedback or an effective bias resulting with feedback) the harmonic levels are the same.

Apparently there is no known way in which to apply feedback to highly efficient single-sided amplifiers and improve the modulation beyond the value obtained without feedback and the same efficiency.

It is seen that in the case of class C amplifiers (single-sided or push-pull) feedback acts to improve the linearity but it is to be noted that if the output is made sufficiently linear by the application of feedback, the efficiency is the same as for class B, namely, 50 or 78½ per cent, respectively. From this Fig. 9, showing the amount of negative feedback and the resulting efficiency to produce a specified harmonic level in the output of a single-sided class C amplifier, it is to be seen that with a straight line tube characteristic as assumed, it will not be advantageous to use feedback to improve a class C amplifier because the effect of feedback on the output wave at any particular load is the same as the effect of reducing the bias so that it is useless to apply more bias than is necessary to produce plate current cut-off. Any additional bias will require more feedback to produce the desired modulation and the efficiency will not be improved.

Large negative peak

With regard to feedback amplifiers, it is to be observed that for single-sided operation (class B or C) the negative peak required on the grid of the output tube (when all harmonics are fed back) is very great as compared to that required for the same tube when operated as a normal class A amplifier, and that the positive peak is approximately twice as great as for the case of the class A amplifier. In Fig. 7 it is shown how for a class B amplifier the size of this negative peak increases with feedback and a curve is presented to show the ratio of negative to positive peak for each value of feedback; and, as indicated above, Figs. 3A and 3B show that the wave form of the grid voltage wave as obtained in a class B amplifier with feedback actually does conform to this analytical prediction, those two figures showing oscillograms of this wave in a particular single-sided class B amplifier.

As mentioned above, the great magnitude of the negative peak makes a very great load for the driving stage. To illustrate, assuming pentode type tubes for the next to the last stage, the negative peak available with 130 volts plate supply does not exceed 100 volts and this is not adequate because, even if a pentode type tube is used in the output, the positive swing applied must be of the order of 30 or 35 volts for full load. As can be seen from Fig. 7, which gives the extent to which the negative swing needs to exceed the positive swing, in the above example it would therefore be impossible to make the modulation better than about 23 to 25 decibels, down on the fundamental, assuming that the pentode tube in the output is biased to extinction.

How to overcome the disadvantage of the large negative peak

However, as mentioned above, this condition can be overcome or mitigated to a very considerable extent by the use of a copper-oxide or other form of rectifier across the grid circuit of the output tube as indicated in Fig. 3 so that the impedance is high for voltages on the characteristic and low for voltages beyond extinction. In this way the modulation with feedback can be made as little as required (70 to 85 decibels below the fundamental) and at the same time the driving stage can be operated as a voltage amplifier and need deliver only 6 decibels more voltage than if the last tube were operated class A. The principle of this action of the rectifier is that if impedance coupling with a blocking condenser is used, it is the current areas which must be equal and not the voltage areas. That is, the condenser does not pass direct current, so the current must have no direct current term. The voltage to ground may, however, have a direct current term. It may be noted that the rectifier principle would not work if transformer coupling were used instead of capacity coupling nor will it work if a choke is used instead of the leak. The voltage amplifier pentodes can deliver a positive peak current of about 6 mils when operated with slightly higher bias than is normal and the mutual conductance is only slightly reduced. Hence, if the grid impedance which includes grid leak, grid capacity and everything on the grid side of the blocking condenser can be held up as high as 100,000 ohms for the active portion of the cycle and made small by the use of the rectifier over the extinction portion of the cycle, the ratio of positive to negative peaks of current may be as high as 20 to 1. In the idealized case this would allow the driver stage to carry adequate load so that by the use of sufficient feedback the modulation could be made as good as 70 decibels below the fundamental.

If the feedback amplifier is push-pull, either class B or class C, and the tubes have similar dynamic characteristics from cut-off up to the bias for which the plate voltage is zero, and if the feedback voltage is picked up in such a manner that a portion of the resultant output of both tubes is fed back; then the large negative peak is not present.

Moreover, as indicated above in connection with filter 13 of Figs. 1 and 3, and as about to be further discussed, if higher harmonics are not to be fed back the difficulties introduced by the large negative peaks vanish to a considerable extent.

Single-sided amplifiers—effect of the band width transmitted by the amplifier and feedback circuits In order to remove frequencies by the use of feedback, those frequencies to be removed in general must be transmitted freely around the $\mu\beta$ path.

In many cases the $\mu\beta$ path will naturally transmit very high frequencies and as a result the output wave will be free from all frequencies except the signal. This is a desirable and valuable property although it does give rise to the large negative peaks mentioned above. In most feedback circuits it is not convenient to maintain $\mu\beta$ at a constant value for all harmonics. Fig. 10 shows what happens in a single-sided class B amplifier when only fundamental, second harmonic and third harmonic are transmitted by the $\mu\beta$ path. Comparing this figure with Fig. 7 to see the effect of feeding back with the fundamental only 2F and 3F instead of all of the harmonics, the large negative peak has been greatly reduced and 2F and 3F are suppressed even more than before. This indicates the desirability of restricting the band width of the feedback path to whatever extent the requirements to be imposed upon the purity of the output will permit, as referred to above in connection with the filter 13 of Figs. 1 and 3.

Supplementing Fig. 10, Fig. 11 shows the wave shape in the grid and plate circuits with large negative feedback for the case in which direct current and all harmonics above the third are suppressed in the feedback path. The wave shown is the grid voltage wave for an amplifier with 60 decibels feedback at fundamental and second and third harmonic frequencies, but no feedback at higher frequencies or for direct current. The solid portion above plate current cut-off is also the plate current wave shape. The dotted portion below plate current cut-off is the grid voltage wave below the plate current cut-off. It will be observed that the negative peak is much smaller than for the case of feeding back all frequencies except direct current. It may be noted that the output is far from sinusoidal, even though, as analysis shows, the second and third harmonics are reduced to a low level by feedback. In fact, the higher harmonics in the output are only a few decibels below the fundamental.

Keeping the control grid always negative

A purpose of class B or C operation is to get the most out of the tube (with plate voltage fixed); yet, particularly with feedback, it is highly desirable to provide for maintaining the control grid always negative during operation of the tube, so that the tube will be capable of being driven by an amplifier of minimum power. Therefore, in Figs. 1 and 3 the class B or output tube may be a tube, for example a pentode, with accelerating grid biased so far positive that the control grid can be biased so far negative as to extend the upper portion of the dynamic characteristic of the tube substantially to its maximum theoretical value without impairing the lower end and without necessitating changing the operating point of the tube or driving the control grid positive.

In this type of operation the positive bias on the accelerating grid tends to increase the plate current, which the negative bias on the control grid tends to decrease, so that sufficiently high positive bias on the accelerating grid enables the required high negative bias of the control grid to be effected without producing too great plate current reducing effect.

Choice of load resistance for maximum power

The method of computation of modulation previously referred to leads naturally to a method of determination of the best output conditions for getting the maximum load from a particular tube at a particular plate current. For maximum efficiency, the plate current should be made to vary between zero and a maximum value and the plate voltage should be made to vary over as wide limits as possible. The minimum plate voltage may be limited by either of two effects. In triode tubes the minimum plate voltage which can be obtained is limited by the fact that the grid is driven positive and under this condition drops to such a low impedance that when operated from a high impedance, such as a screen grid tube, it is substantially impossible to drive the grid appreciably positive.

If it is assumed that the plate current varies sinusoidally from zero to $I_{max}$ and if the voltage from plate to cathode varies sinusoidally from $E_{min}$ to $(2E_b - E_{min})$ where $E_b$ is the average applied plate potential and $E_{min}$ is the minimum instantaneous plate potential corresponding to the peak of current $I_{max}$, the power output is given by the relation:

$$\text{Power output} = W = \frac{I_{max}(E_b - E_{min})}{4}$$

This relation comes from the fact that the value of the sine wave of current is $$\frac{I_{max}}{2}$$

and the value of the sine wave of voltage is $(E_b - E_{min})$.

To choose the condition to give maximum power it is only necessary to have a characteristic of plate current versus plate voltage for zero bias, assuming the grid cannot be driven positive. From this and the assumed value of plate voltage plot a curve of $I_{max}(E_b - E_{min})$ versus $I_{max}$, considering $I_{max}$ and $E_{min}$ as corresponding values on the above curve. It is also possible to plot a curve of efficiency at full load versus $I_{max}$ from the relation, $$\text{Efficiency} = \frac{50(E_b - E_{min})}{E_b}\%$$

It will be noted that the efficiency increases as $I_{max}$ decreases. As the curve for power output has a rather broad maximum the value of $I_{max}$ to be used may be chosen slightly below that for maximum power if better efficiency is desired.

Having chosen the value of $I_{max}$ to be used the corresponding load resistance R is determined from the relation, $$R = \frac{2(E_b - E_{min})}{I_{max}}$$

If greater efficiency is desired and less output is necessary, the value of $I_{max}$ may be reduced and R may be raised thus making $E_{min}$ much smaller and raising the efficiency but reducing the amount of output available.

Most pentodes have a rather sharp bend in the plate voltage-plate current characteristic and the plate current at some point in the knee is the correct value for $I_{max}$ if the maximum power is desired. The method of choosing $I_{max}$ to make the power a maximum is the same as for a triode but the value of $E_{min}$ will be found to be much smaller than for a triode. For this reason not much increase in efficiency can be obtained by reducing the power output, but the efficiency is very good being as high as 45 per cent even with moderately low applied voltages.

The above requires that the tube does not work into its own impedance. In some instances it is desirable to have the output impedance of the amplifier equal a predetermined value. By using feedback these two requirements are not incompatible, as disclosed in the above-mentioned H. S. Black Patent 2,131,365 and H. S. Black Patent 2,007,172, July 9, 1935.

*More detailed discussion of efficiency*

The entire discussion, in accord with customary practice and definitions, will be limited to a consideration of the plate or anode power furnished by the power supply with and without signal input. The efficiency of the power supply itself is not considered. Neither is the filament power. For very low power amplifiers using low values of plate voltage, the filament power, however, might well exceed the plate power. Other things being equal, the filament power tends to depend solely upon the plate current and it is for this reason that if the power output of the amplifier is to be large, the plate voltage is usually made as great as practicable.

*Efficiency of single-sided amplifiers*

The efficiency of this type of amplifier is of considerable practical interest. Since the plate current, with no input signal applied, can be made quite small without affecting the transmission performance, assuming sufficient negative feedback, and since the time during which the amplifier load is high is, for many applications in the communication field, a very small part of the total time, the all day efficiency of such an amplifier may be quite high as will be explained later.

Inasmuch as the tube is biased to cut-off, which is the usual class B condition, it might be expected that the efficiency at full load would approach 78.5 per cent as a limit but this is not the case. In any unbalanced amplifier delivering a pure sinusoidal wave, the maximum efficiency is 50 per cent. This can be shown as follows: The peak alternating current with input cannot exceed the direct current supplied without bias, and the peak alternating voltage from plate to cathode cannot exceed the direct current applied voltage, even if the instantaneous plate voltage can be driven to a minimum of zero. Consequently, whereas the applied power is $E_b I_b$, the alternating current output power is $$\frac{E_b I_b}{2}$$

giving an efficiency of 50 per cent.

With practical or realizable tubes, the instantaneous plate voltage usually cannot be driven below some value between 15 and 30 volts, because, at the instant of minimum voltage, the instantaneous plate current must be a maximum. With the usual range of low applied plate supply voltages, the maximum full load efficiency for any single-sided amplifier delivering a substantially pure sine wave ordinarily cannot be better than some figure between 35 and 45 per cent. This conclusion is applicable to any mode of operation and is independent of what bias is used or by what means the output tube is caused to deliver a sinusoidal output. That is, if the bias is high, the input wave will be extremely distorted so as to yield a sinusoidal output; but the efficiency will be exactly the same as if the bias were in the middle, and the grid wave, required to deliver a pure output, nearly pure. If the higher harmonics are not fed back, the efficiency may, of course, be somewhat better.

*Efficiency of push-pull amplifiers*

If the amplifier is connected in push-pull and if the two tubes have linear dynamic characteristics from cut-off up to the bias for which the plate voltage is zero, the direct current in the plate circuit with full load may be as low as .6366 times the peak alternating current, provided the tubes are biased to cut-off and the output of the two tubes together is sinusoidal. That is, each tube in turn delivers a half sine wave and the direct current term is .6366 times the peak, the peak thus being 1.57 times the direct current term. The peak alternating voltage has a maximum value equal to the applied direct current plate voltage. Consequently, whereas the applied power is $E_b I_b$, the alternating current output power is $$\frac{E_b}{\sqrt{2}} \times \frac{1.57 I_b}{\sqrt{2}} = .785 E_b I_b$$

Hence the maximum efficiency is 78.5 per cent at full load. With small practical tubes using moderate applied potentials the efficiency may range from 60 per cent to 70 per cent. If feedback is applied to such an amplifier and if the fed back voltage is picked up in such a manner that the resultant of the output of both tubes is fed back, then the effect of feedback is to make the tubes approach the ideal linear case more nearly, and each tends to deliver half of a sine wave. Therefore, this type of amplifier is capable of delivering a pure output with an efficiency of 60 per cent to 70 per cent at full load with small practical tubes whereas under similar conditions, the single-sided amplifier cannot exceed 35 per cent to 45 per cent using a similar tube.

Higher efficiency not obtained by class C operation

It may be mentioned that it is impossible to take advantage of the high efficiency to be obtained by class C amplification and still reduce all the harmonics by the application of feedback in any known manner. If feedback is applied to reduce the harmonics by appreciable amounts, the efficiency will drop to that corresponding to class B operation even if the bias is such as to give highly efficient class C operation without feedback.

The reason for this is apparent when it is considered that if the harmonics are suppressed each tube must deliver half of a sine wave and for half sine loops the direct current is .6366 times the peak current and no less. Therefore, the power delivered to the load cannot exceed 78.5 per cent of the power supplied even if it were possible to drive the instantaneous plate voltage to zero. The high efficiency of class C amplifiers is obtained because plate current flows for less than half a cycle. As the portion of the cycle over which plate current flows approaches zero the ratio of fundamental peak value to average direct current approaches two and the efficiency of the ideal tube approaches 100 per cent.

Summary of efficiency formulae

For practical tubes which have a minimum below which the instantaneous plate voltage cannot drop even with optimum drive on the grid, the efficiency of a class C amplifier without feedback approaches a limit which is given by:

$$\text{Maximum efficiency} = 100 \frac{E_b - E_{min}}{E_b} \%$$

If a push-pull amplifier is to use feedback to reduce the harmonics by substantial amounts and if the bias is sufficient so that plate current flows over no more than half the cycle, than the efficiency at full load is:

$$\text{Full load efficiency} = 78.5 \frac{E_b - E_{min}}{E_b} \%$$

In a single-sided amplifier if feedback is applied to reduce the harmonics appreciably, the plate current then flows over practically the entire cycle and the full load efficiency is given by:

$$\text{Full load efficiency} = 50 \frac{E_b - E_{min}}{E_b} \%$$

Summing up the subject of efficiency of feedback amplifiers, any single-sided amplifier having sufficient feedback to reduce the harmonics to a negligible value is, insofar as the plate circuit is concerned, a class A amplifier. This is true whether the bias is low so that the amplifier is class A without feedback, or even if the bias is at or below the plate current cut-off with no input. Therefore, the efficiency is that which is characteristic of the class A amplifier. If a push-pull amplifier is used, the plate circuit performance shifts, as more bias is applied, from class A with normal bias to class B when the bias reaches the cut-off, and continues to be class B even when the bias exceeds that required for plate current cut-off provided adequate feedback is used. It is therefore, useless to apply more bias as the modulation would be likely to be degraded.

All-day efficiency of single-sided amplifiers

A quantity which may be of greater interest than the efficiency at full load is one which will be termed the all-day efficiency. All-day efficiency will be defined as the ratio of maximum power capacity to average power supplied in the plate circuit. It is not limited to 100 per cent as can readily be seen and would be infinite if the amplifier were idle all the time and yet had the ability to supply a finite load. If an amplifier is biased to cut-off and carries full load for one-tenth of the time and is idle nine-tenths of the time the efficiency while working might be 50 per cent but its all-day efficiency, as defined above would be 500 per cent. A normal class A amplifier having constant plate current would have an all-day efficiency of 50 per cent or it would take ten times as much total energy to the plate circuit.

If an amplifier is used 1/A of the total time at full load and is idle the remaining time the all-day efficiency is obtained by multiplying its full load efficiency by A, provided it draws no power during the idle time. The method of adjusting for other divisions of load and for amplifiers that take some power when idle is apparent. The all-day efficiency is a better measure of the merit of an amplifier for intermittent service than the usual efficiency.

Class B operation for better all-day efficiency

For a single-sided amplifier the full load or maximum output of the amplifier assuming considerable negative feedback depends only upon the plate voltage and load resistance assuming the filament has adequate emission and the tube is designed to keep the control grid negative as discussed above.

To obtain the very best modulation for this particular value of full load (that is, to conserve the amount of gain to be sacrificed by negative feedback to meet a specified modulation requirement) the optimum grid bias is the one such that the plate current extinction and the minimum plate voltage limitation are both reached at exactly the same load which is the full load in question. It should be further noted that the input in this case is distorted.

If the negative bias is reduced from this value, the modulation at light loads will in general be improved but the grid will be driven positive at a lighter load, and, after the grid is positive, the modulation will be worse than if the optimum bias, as previously described, had been used.

However, coming to the main point, if it is desired to obtain more rise in plate current under load in order to obtain a higher value of all-day efficiency, it can be shown that it is theoretically possible to increase the bias to any extent up to the cut-off of the plate current and the harmonics may still be improved to any extent desired by the use of sufficient feedback. As explained above, there ordinarily would be no advantage in increasing the bias to beyond the cut-off of the plate current.

Therefore, to obtain maximum power savings with no sacrifice in linearity, the amplifier should be push-pull class B which theoretically requires only 63.7 per cent as much power as a single-sided class B. For more moderate amounts of power, while the single-sided class B amplifier is poorer than the push-pull arrangement, if all-day efficiency is a factor, it is altogether superior to a single-sided class A amplifier. A class B amplifier can be looked upon as automatically drawing plate power only when the amplifier is being used.

For applications where power saving is not a factor, after a design is completed, the grid bias can be adjusted to an optimum from the standpoint of minimum modulation as explained in the second paragraph of this section.

*Relative advantages of class B push-pull and class B single-sided amplifiers*

The advantages of a single-sided amplifier are that only a single tube is needed in the output, and, if the amplifier has more than one stage, no push-pull interstage is required.

The disadvantages of a single-sided amplifier are: (1) the efficiency at full load is only about two-thirds as large; (2) to meet a specified modulation requirement requires at least 15–25 decibels more feedback and, hence, gain; (3) the driver stage if there is one must be slightly unconventional in design; (4) in large amplifiers where the load is limited by plate dissipation rather than peak current, the output load is reduced because of lower plate efficiency. If the peak current is the limiting factor, the maximum load per tube is the same.

What is claimed is:

1. The method of operating a rectifying device in a feedback loop which comprises feeding back around said loop alternating current and direct current in gain-reducing phase and in magnitude sufficient to reduce distortion of the rectified output from said device below the value without feedback to render the rectifying device more nearly linear.

2. A rectifier device, and means for rendering the device more nearly a linear rectifier, said means comprising means cooperating with said device to form a closed feedback loop producing feedback around said loop of alternating current and direct current that reduce distortion of the wave portions transmitted by said device.

3. A wave translating system comprising cascaded, direct coupled electric space discharge devices, means for operating one of said devices with space current interruptions, and means cooperating with said devices to form a closed feedback loop transmitting direct and alternating current components around the loop through the devices in sufficient magnitude to render more nearly linear the relation of plate current of said one device to input voltage of the system within the portion of the cycle within which plate current flows.

4. A wave translating system comprising a source of waves, an electric space discharge device connected thereto for transmitting portions only of said waves, means cooperating with said device to form a closed feedback loop producing simultaneous feedback around said loop of alternating current and direct current that reduce distortion of the wave portions transmitted by said device and thereby render the device a linear rectifier, and means operable for suppressing transmission of direct current around said loop while maintaining feedback around the loop of alternating current that renders the device a more nearly linear amplifier.

5. In an amplifier operated in accordance with so-called class B operation in which such a large grid bias is used that the plate current without feedback would be interrupted for the order of half the period of the waves being amplified, means for improving the operation by feeding back a portion of the output waves in gain-reducing phase and in amount sufficient to reduce the distortion below the distortion level without feedback, and means for reducing negative peaks of grid swing comprising impedance across the grid circuit of value high for voltages on the dynamic characteristic and low for voltages beyond plate current extinction.

6. A wave translating system comprising an electric space discharge tube having anode, cathode and grid elements, a source of input waves therefor, means for causing extinction of the space current of said tube during an appreciable portion of the negative swing of the waves from said source, means for producing feedback in said tube of waves that reduce the magnitude of its output waves below their magnitude without feedback, and means connected across the grid circuit of the tube having high impedance for voltages on the plate current-grid voltage dynamic characteristic of the tube and low impedance for voltages beyond plate current extinction.

7. In a multistage amplifier, a power stage operated in accordance with so-called class B operation, in which such a large grid bias is used that the plate current without feedback would be interrupted for the order of half the period of the waves being amplified, a driving stage comprising a pentrode, coupling means comprising a coupling condenser and a grid leak resistor coupling the driving stage to the power stage, means for improving operation of the amplifier by feeding back a portion of the output waves in gain-reducing phase and in amount sufficient to reduce the distortion below the distortion level without feedback, and means for reducing the ratio of negative to positive peaks of grid swing in the power stage comprising a rectifier connected across the grid-cathode circuit of that stage and having high impedance for voltages on the plate current-grid voltage dynamic characteristic and low impedance for voltages beyond plate current extinction.

8. In an amplifier having an output stage operated in accordance with so-called class B operation, in which the steady grid potential is such that the plate current without feedback would be interrupted for the order of half the period of the waves being amplified, means cooperating with said amplifier to form a closed feedback loop transmitting around the loop frequencies to be suppressed and discriminating against transmission around the loop of other frequencies whose transmission around the loop would tend to increase the ratio of the negative to the positive peaks of grid swing in the output stage.

9. In an amplifier operated in accordance with so-called class B operation, in which such a large grid bias is used that the plate current without feedback would be interrupted for the order of half the period of the waves being amplified, means for improving the operation by feeding back a portion of the output waves in gain-reducing phase and in amount sufficient to reduce the distortion below the distortion level without feedback, said portion of said output waves including fundamental waves and first and second harmonics to the exclusion of higher harmonics.

10. A wave translating system comprising a source of voltage waves, a load circuit for utilizing direct current obtained from said waves by rectification thereof, a wave amplifying and rectifying device having an input circuit connected to said source and an output circuit connected to said load circuit for transmitting portions only of said waves from said source to said load circuit as current pulses and thereby producing rectification of said waves, and means cooperating with said device to form a closed feedback loop producing feedback around said loop of the alternating current and direct current components of said transmitted portions in reversed phase and in sufficient magnitude to render more nearly linear the relation of instantaneous current in said load circuit to instantaneous voltage of said source throughout each of the transmitted wave portions.

11. A wave translating system comprising an electric space discharge wave rectifying device having anode, grid and cathode structures, a grid-cathode circuit for said device, means for supplying to said circuit voltage waves to be rectified by said device, and means cooperating with said device for extinguishing space current between said anode and cathode structures during only time portions of said waves in which their instantaneous voltage magnitudes are below a given value substantially less than the maximum and for producing negative feedback in said device of the transmitted remaining time portions of said waves with the round trip feedback voltage ratios for the direct and the essential alternating components of said transmitted portions of greater order of magnitude than unity and sufficient uniformity to substantially reduce distortion of said transmitted portions.

12. In a wave translating system, an electronic wave amplifying and rectifying device having an anode, a cathode and a grid, an input circuit comprising a source of alternating voltage having a fundamental frequency connected to said grid and said cathode for producing rectification of said voltage voltage in said device, an output circuit connected to said anode and said cathode, and means comprising a resistance common to said input and output circuits for supplying sufficient biasing potential to said grid to extinguish anode current of said device throughout negative swings of said alternating voltage and producing negative feedback in said device of the portions of the wave of said voltage that are transmitted through said device, with the round trip feedback complex voltage ratios for frequencies from zero to values high relative to said fundamental frequency of sufficient magnitude and uniformity to render more nearly linear the relation of instantaneous values of the anode current transmitted by said device to the instantaneous values of the voltage of said source throughout the time when each of said portions of said wave is being transmitted through said device and thus reduce distortion of the rectified output of said device substantially below the value without feedback.

13. A wave translating system comprising an electric space discharge wave rectifying device having anode, grid and cathode structures, an anode-cathode circuit for said device, a source of continuous voltage in said circuit for producing anode-cathode space current in said device, a grid-cathode circuit for said device, means for supplying to said grid-cathode circuit waves to be rectified by said device, said supplied waves having a fundamental component of given frequency, means in said grid-cathode circuit for biasing said grid structure to a potential substantially just sufficient to reduce said anode-cathode space current of said device to zero value in the absence of said waves in said grid-cathode circuit, and a linear impedance connected in said anode-cathode circuit and said grid-cathode circuit forming with said circuits and said device a feedback loop for producing reversed phase feedback in said device with the propagation around said loop for frequencies including zero frequency and said given frequency and harmonics thereof approximately equal and of greater order of magnitude than unity.

14. A linear detector system comprising a screen grid tube of comparatively high internal resistance, an un-by-passed resistor connected to the cathode of said tube and included in both the input and output circuits of said tube whereby a degenerative effect is produced, and an impedance in the output circuit of said tube which has a value of small magnitude as compared to the internal resistance.

JAMES O. EDSON.